US007609926B2

United States Patent
Rosenquist et al.

(10) Patent No.: US 7,609,926 B2
(45) Date of Patent: Oct. 27, 2009

(54) OPTICAL FIBER CABLE (75) Inventors: Jeff Rosenquist, Wendell, NC (US); David Keller, Cary, NC (US)

(73) Assignee: Nexans, Paris (FR)

( * ) Notice: Subject to any disclaimer, the term of this patent is extended or adjusted under 35 U.S.C. 154(b) by 27 days.

(21) Appl. No.: 11/893,365

(22) Filed: Aug. 14, 2007

(65) Prior Publication Data

US 2008/0232749 A1    Sep. 25, 2008

Related U.S. Application Data (60) Provisional application No. 60/919,960, filed on Mar. 23, 2007.

(51) Int. Cl.
*G02B 6/44* (2006.01)
(52) U.S. Cl. ........................... 385/109; 385/100
(58) Field of Classification Search .............. 385/100, 385/109
See application file for complete search history.

(56) References Cited

U.S. PATENT DOCUMENTS

| 6,744,955 | B2* | 6/2004 | Nechitailo et al. | 385/114 |
| 7,269,318 | B2* | 9/2007 | Cook | 385/100 |
| 2004/0240809 | A1* | 12/2004 | Tedder et al. | 385/109 |
| 2008/0056651 | A1* | 3/2008 | Nothofer et al. | 385/109 |

\* cited by examiner

*Primary Examiner*—Jennifer Doan
(74) *Attorney, Agent, or Firm*—Sofer & Haroun, LLP (57) ABSTRACT

An optical fiber cable maintains an outer jacket, at least one optical fiber tube within the jacket and for each optical fiber tube, four optical fibers, arranged in a substantially squared arrangement. The optical fibers are linearly arranged along the length of the cable. The optical fibers are loosely arranged within the fiber tube in such a manner as to allow shifting of the straight optical fibers to conform to a bending of the cable, while being simultaneously constrained such that the straight arranged fibers do not become crossed-over or overlapped during bending.

20 Claims, 13 Drawing Sheets (PRIOR ART)

OPTICAL FIBER CABLE

RELATED APPLICATION

This application claims priority to U.S. Provisional Patent Application No. 60/919,960, filed on Mar. 23, 2007, the entirety of which is incorporated by reference.

FIELD OF THE INVENTION

The present invention relates to the field of optical fiber cables. More particularly, the present invention relates to the field of optical fiber cables having an improved design and attenuation attributes.

BACKGROUND

Optical fiber cables are well known in the communication industry as cables that include one or more optical fibers for optically transmitting communication signals.

Among other constructions, one of the popular arrangements for optical fibers cables is a bundling of six to twelve individual optical fibers within a tube (also referred to as a buffer tube) in a loose arrangement, allowing for some movement of the optical fibers within the tube. This is referred to as a "loose tube" arrangement. Moreover, to form the optical fiber cable, one or more tubes may be bundled within an outer cable jacket for additional protection from the environment and also to provide an increased number of fibers within a particular cross section, useful for commercial installations.

However, there are several competing concerns that affect the design and production of such optical fiber cables. The first of these concerns is the optimum amount of fibers per tube. In typical installations larger optical fiber cables have multiple tubes therein. The greater the number of fibers per tube, the greater the overall communication capacity for the optical fiber cable. However, more fibers per tube may result in difficulty accessing individual fibers within a tube (e.g. for connection to optical equipment). Furthermore, more fibers add weight to the cable as well as geometrical constraints, both of which add costs in the form of materials and production difficulties.

A related second drawback to existing optical fiber cables of this design is the attenuation in fiber signals that occur when the optical fiber cable is bent. Attenuation occurs when individual fibers within an optical fiber cable are bent resulting in the optical signals being propagated therethrough to partially or totally exit the fiber. Increases in the number of fibers within each of the tubes in an optical fiber cable and their consequent geometric configuration, however restricts the possible movements of the fibers during bending, causing awkward and strained bending resulting in attenuation.

Figure 1:
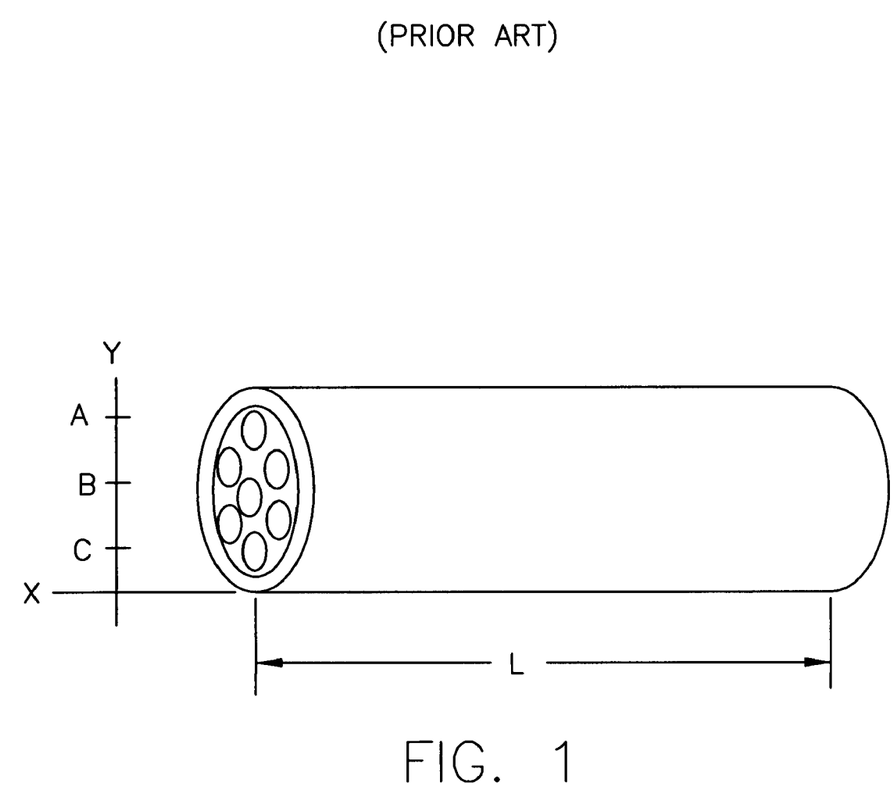
FIG. 1 shows a prior art optical fiber cable.
Figure 2:
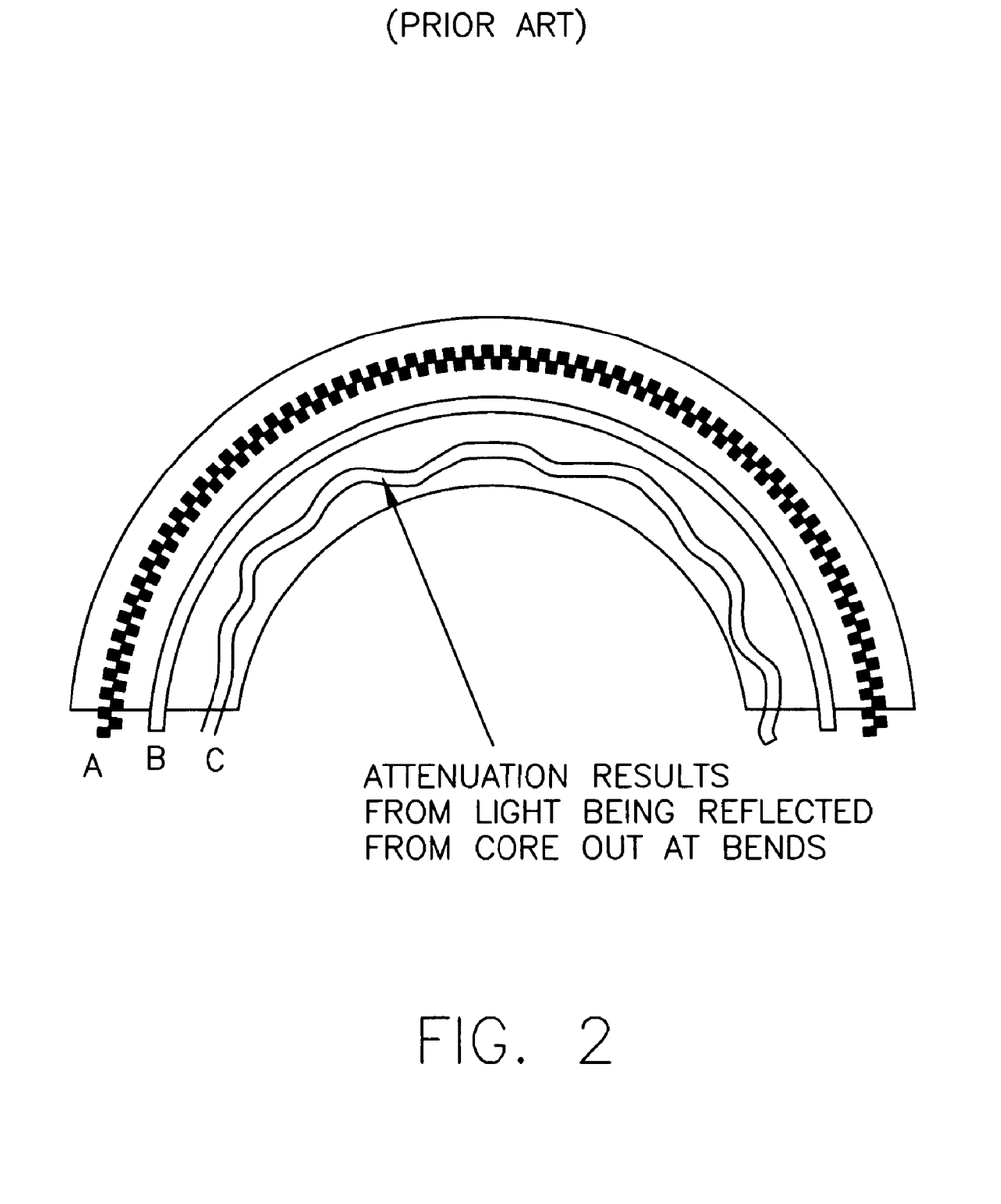
FIG. 2 shows a bent version of the prior art optical fiber cable from FIG. 1.

Prior art FIG. 1 shows an exemplary prior art arrangement optical fiber cable having seven fiber tubes within a jacket. Prior art FIG. 2 shows a hypothetical bend of the fiber cable from FIG. 1. The centrally located tubes (b) can conform to the center of the bent cable, but tubes along axes (a) and (c) are either stretched or compressed, resulting in signal attenuation. Thus, the more fibers placed in fiber optic cable the more attenuation in the fiber signal, particular with fibers closer to the inside wall of the cable jacket.

Given the constraints of attenuation from bending, combined with the desire to meet customer communication throughput needs by providing sufficient fibers per cable, prior art optical fiber cables are designed to include a substantial number of fibers per tube (typically between 6 and 12 fibers per tube). However, even with this range of fibers per tube, the attenuation at bend radiuses that occur in common installations results in significant signal attenuation.

To address this, prior art designs have added to the cable either strength members or binding ribbons to resist bending (or to prevent over-bending as some bending is required) or they have added fillers such as petroleum jelly or other gels, in either the tubes or around the tubes in the jacket. U.S. Pat. No. 4,230,395 discusses an example of such gel filled tubes. Yet another method of preventing attenuation in the fibers in these cables is to strand the fibers in a helical or S-Z arrangement so that no one fiber is consistently disposed along the far side of a bend axis.

All of these solutions are less than desirable. The addition of strength members adds additional construction components, adding cost in both materials and cable construction complexity. Furthermore, the strength members add additional weight to the final product. The addition of gel fillers also adds cost in both materials and extrusion complexity, adds weight, as well as the additional drawback of a fire fuel, which contributes to such gel filled cables failing the necessary fire safety standards for certain indoor uses.

Stranding, adds significant cost to the production of a cable in that the twisting of the fibers requires that more fiber per foot of cable is necessary to span a given distance relative to a straight or non-stranded fiber cable. Also, in the stranded arrangement, fibers acquire an inherent wavy quality that includes a certain amount of bending, which can result in failure of the cladding to contain the light signal through reflection, resulting in undesired attenuation.

OBJECTS AND SUMMARY

The present invention looks to overcome the drawbacks associated with the prior art and to provide an improved optical fiber cable that is both straight and that uses the least amount of additional bend protection components (to remove fire/fuel concerns). Such a fiber cable does not contain gel fillers or excessive strength members, while simultaneously provides a plurality of optical fibers per tube within the cable. The resulting structure is thus totally dry, relatively lightweight and maintains a fiber geometry within the fiber tubes that assists in preventing attenuation of optical signal.

In one arrangement, an optical fiber cable maintains one or more tubes, each of which maintain four fibers per tube, which are snugly held in a longitudinal position. The arrangement is sufficiently tight to prevent random overlapping or criss-crossing that may lead to such faults as compression induced micro bending. The arrangement also simultaneously allows for the individual repositioning of the fibers from the neutral axis (in a bend) to obtain an optimum lowest-stress position.

In one arrangement, the fibers are sufficiently loose within the tube so as to allow an installer the ability to perform a 20" strip (strip capacity) without damaging the tubes/fibers within the jacket and the tube modulus is such that it allows repositioning of the fibers in the tubes, even under colder temperatures in the range of 0° C. through −60° C.

In one arrangement, the four fiber tubes allow the fibers to be fed straight (un-stranded) during extrusion, with the possible addition of a water swellable yarn of sufficient flexibility that allows the fibers to continue repositioning themselves relative to a hypothetical neutral bend axis.

To this end the present invention provides for an optical fiber cable having an outer jacket, at least one optical fiber tube within the jacket and, for each optical fiber tube, four optical fibers, arranged in a substantially squared arrangement. The optical fibers are linearly arranged along the length of said cable and the optical fibers are loosely arranged within the fiber tube in such a manner as to allow shifting of the straight optical fibers to conform to a bending of the cable, while being simultaneously constrained such that the straight arranged fibers do not become crossed-over or overlapped during bending.

DETAILED DESCRIPTION

Figure 3:
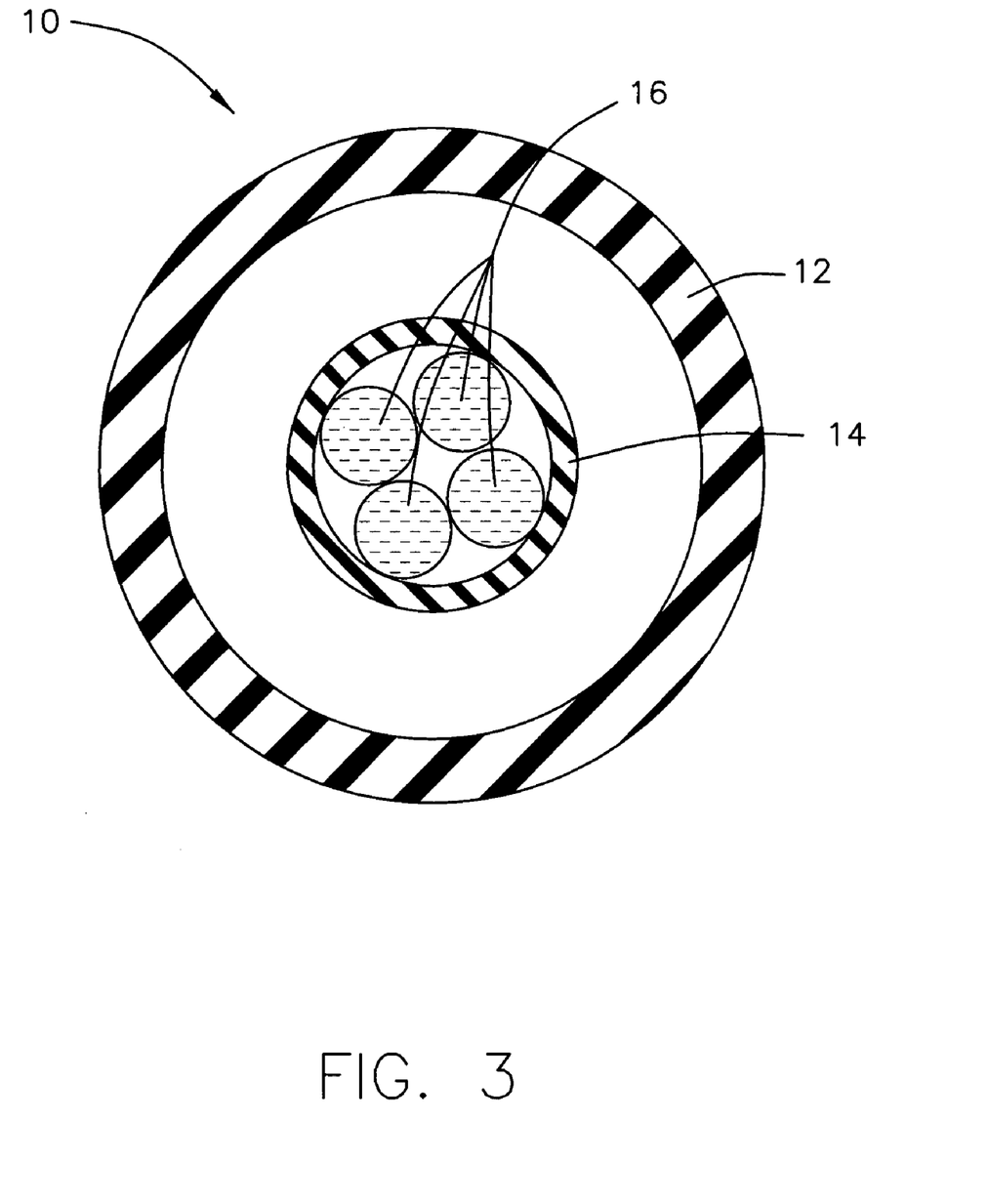
FIG. 3 illustrates an optical fiber cable in accordance with one embodiment.

In one embodiment, FIG. 3 illustrates an optical fiber cable 10 according to the present invention. Optical fiber cable 10 includes an outer jacket 12, a fiber tube 14, and four optical fibers 16 contained within fiber tube 14 in a loose tube arrangement.

Jacket 12 and tube 14 are preferably constructed of a standard polymer used in the optical fiber industry such as FRPVC (Flame Retardant Polyvinylchloride), PVDF (Polyvinydiene Fluoride), FEP (Fluorinated Ethylene Propylene) and PE (Polyethylene), however other polymers may be used based on desired fire safety, costs and flexibility considerations. Preferably, tubes 14 may be color coded for proper organization and identification of the tubes within cable 10 as will be described in more detail below.

Fibers 16 are preferably typical UV coated optical fibers 250 microns in diameter of the type commonly used in fiber optic signal transmission. As with tubes 14, preferably fibers 16 may be color coded for proper organization and identification of the fibers within cable 10.

Figure 4:
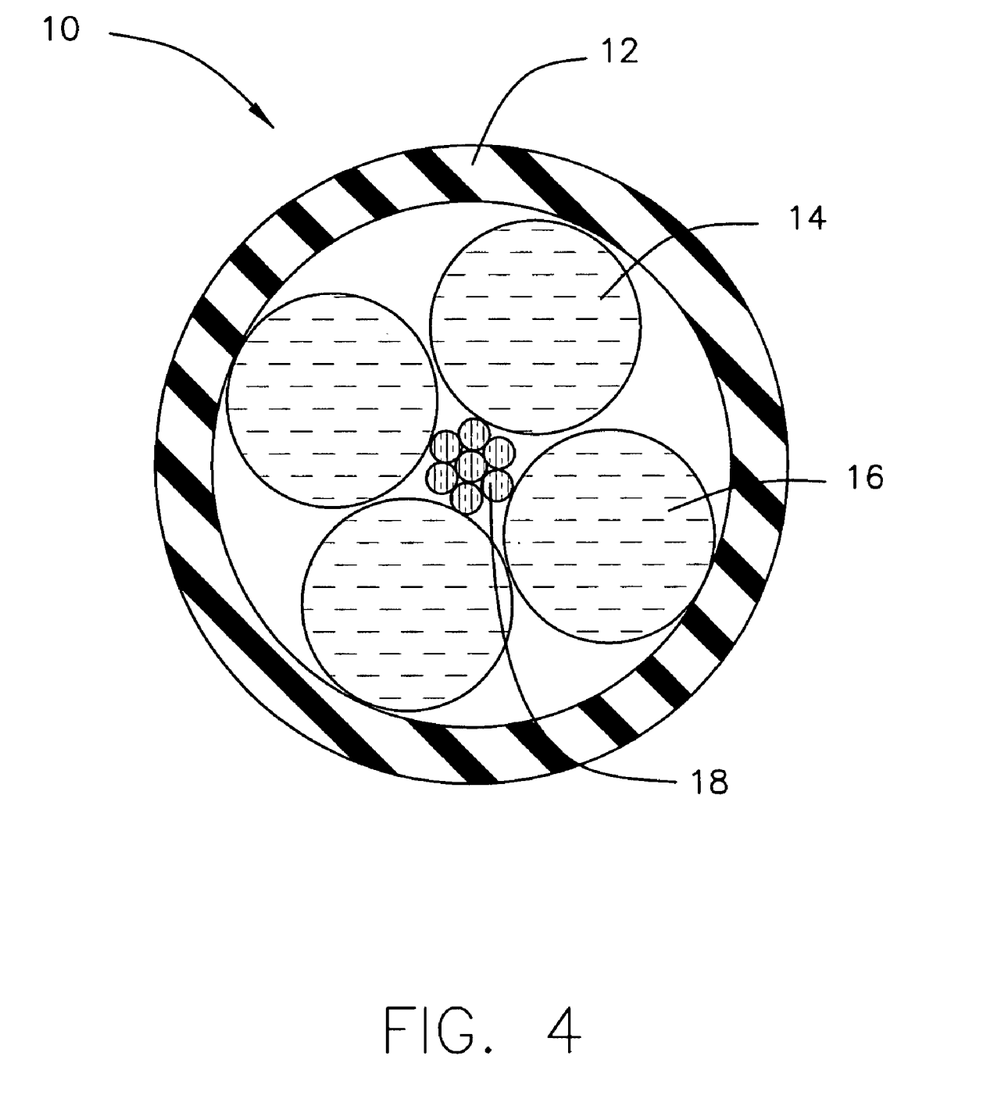
FIG. 4 illustrates an optical fiber cable in accordance with another embodiment.
Figure 5A:
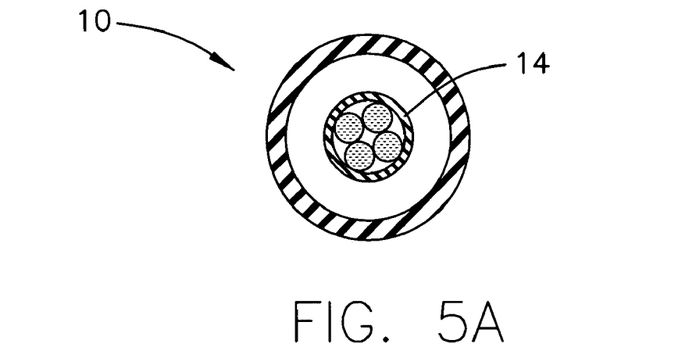
FIGS. 5A-5M illustrate optical fiber cables of different sizes in accordance with several embodiments.
Figure 5B:
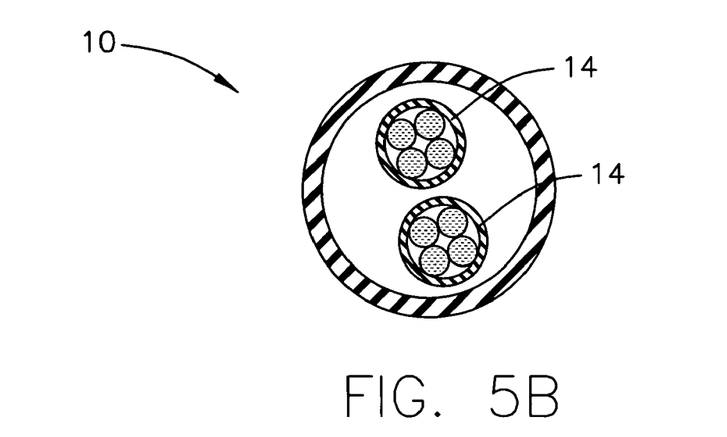
Figure 5C:
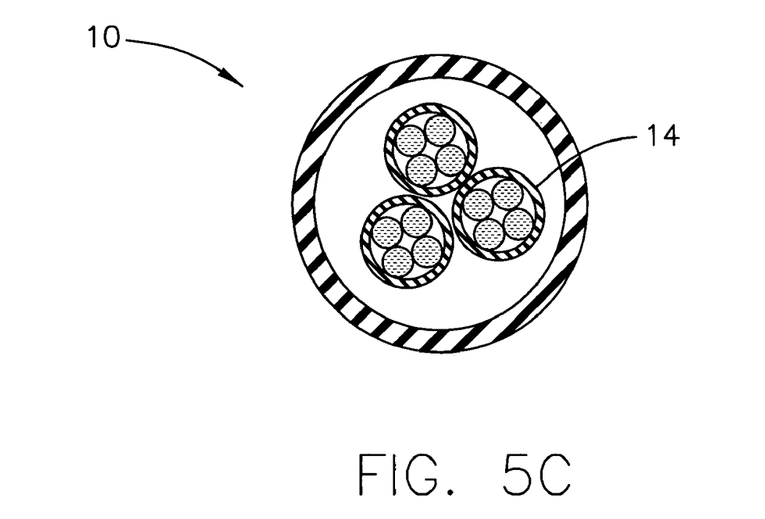
Figure 5D:
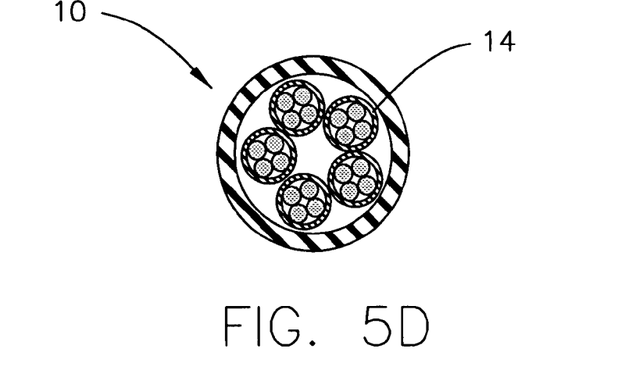
Figure 5E:
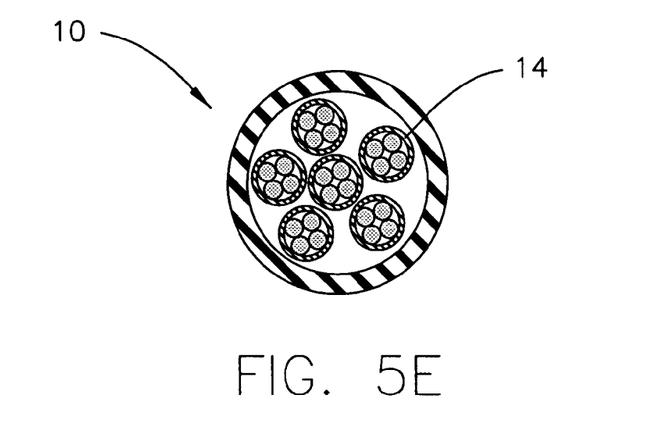
Figure 5F:
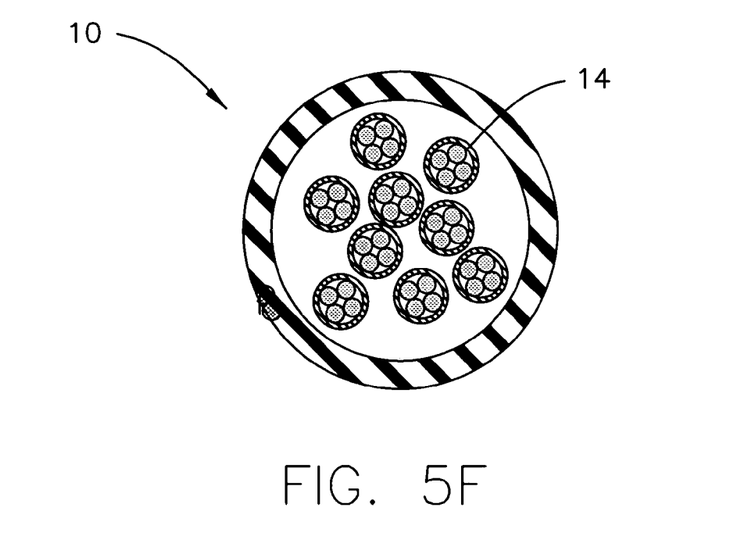
Figure 5G:
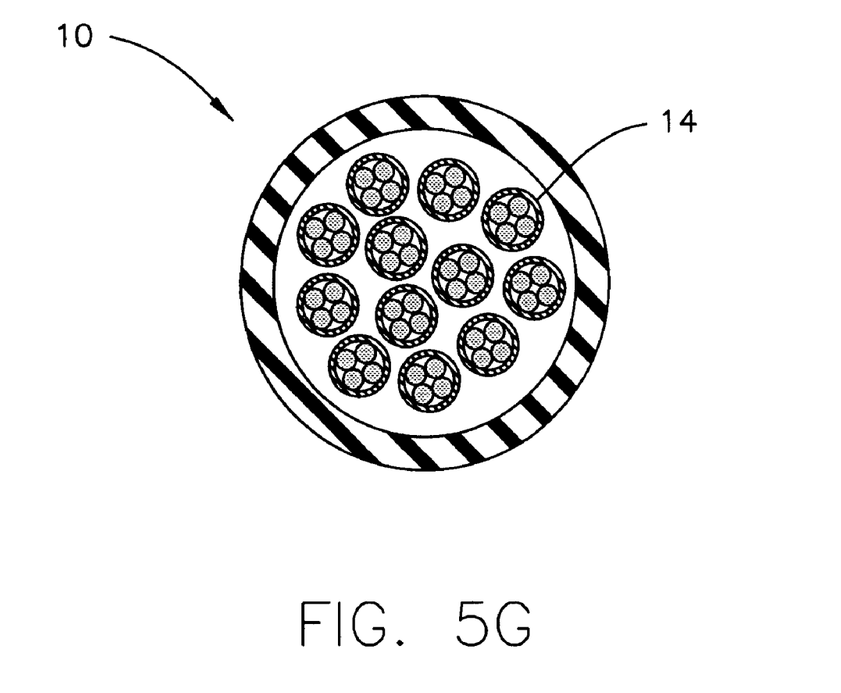
Figure 5H:
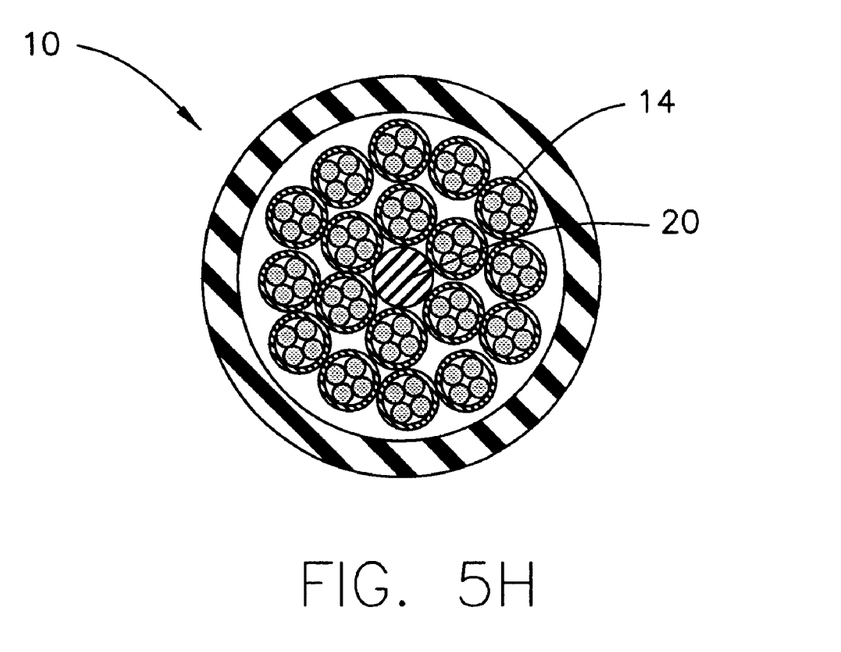
Figure 5I:
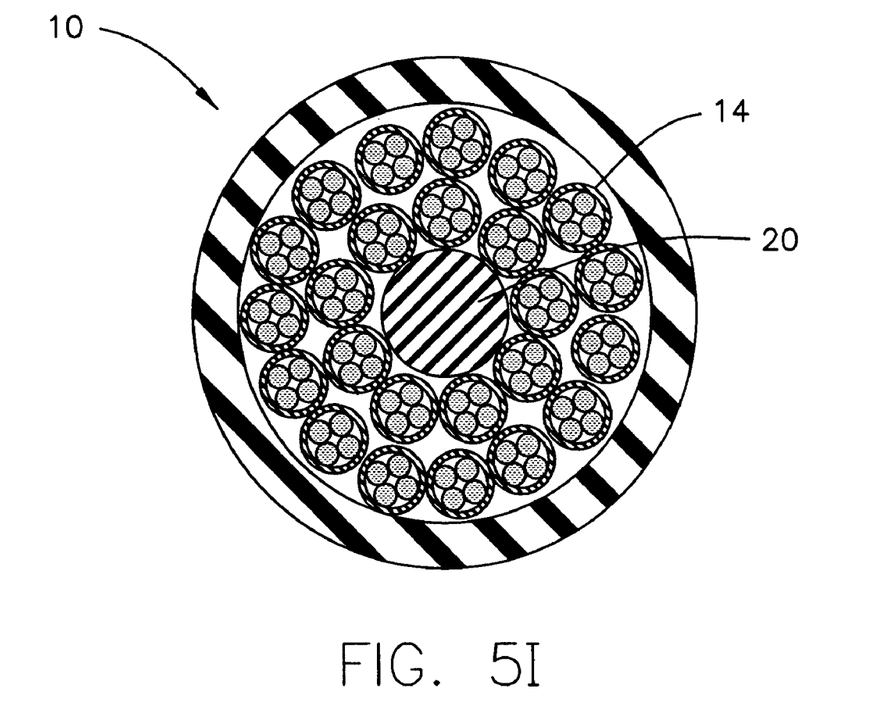
Figure 5J:
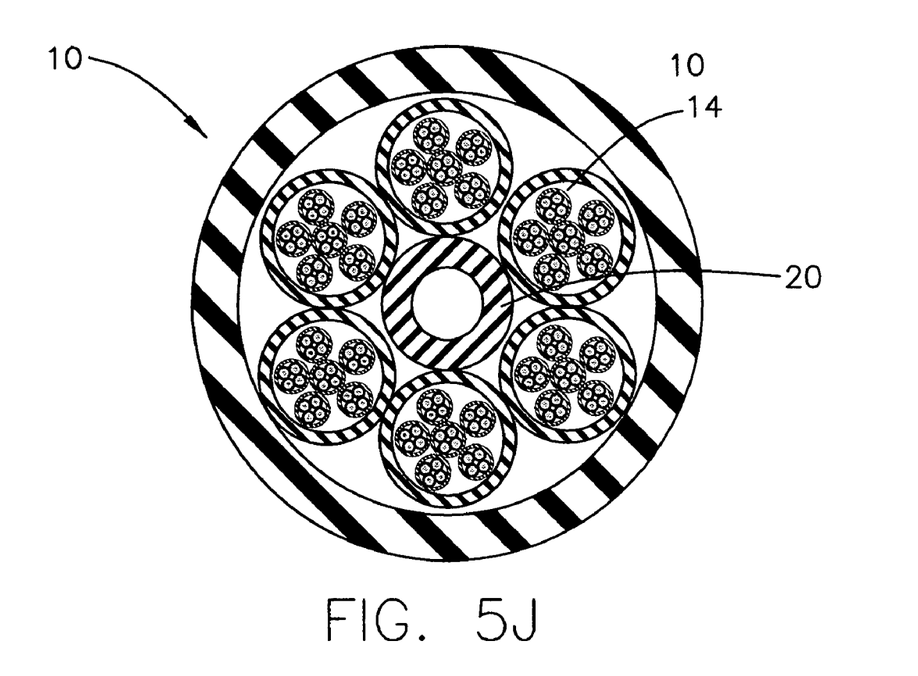
Figure 5K:
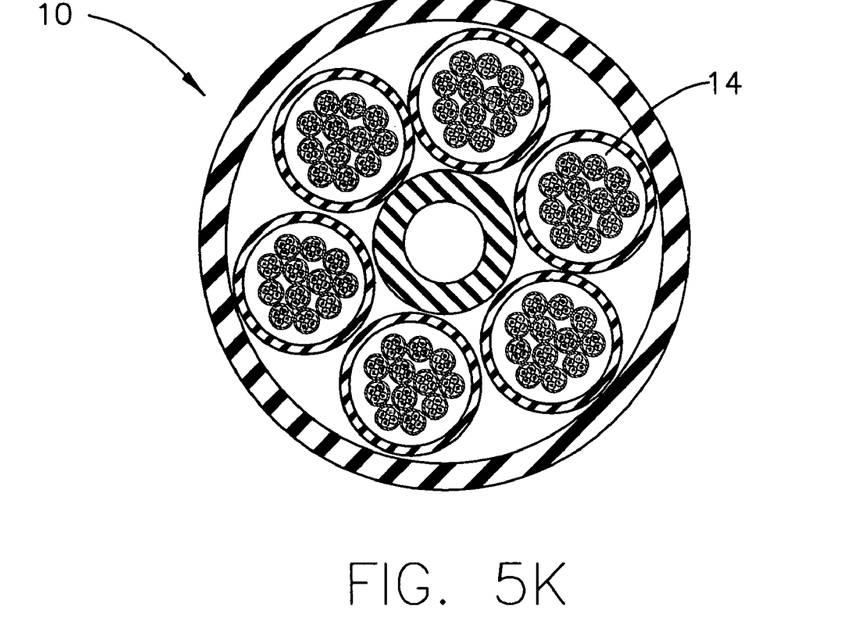
Figure 5L:
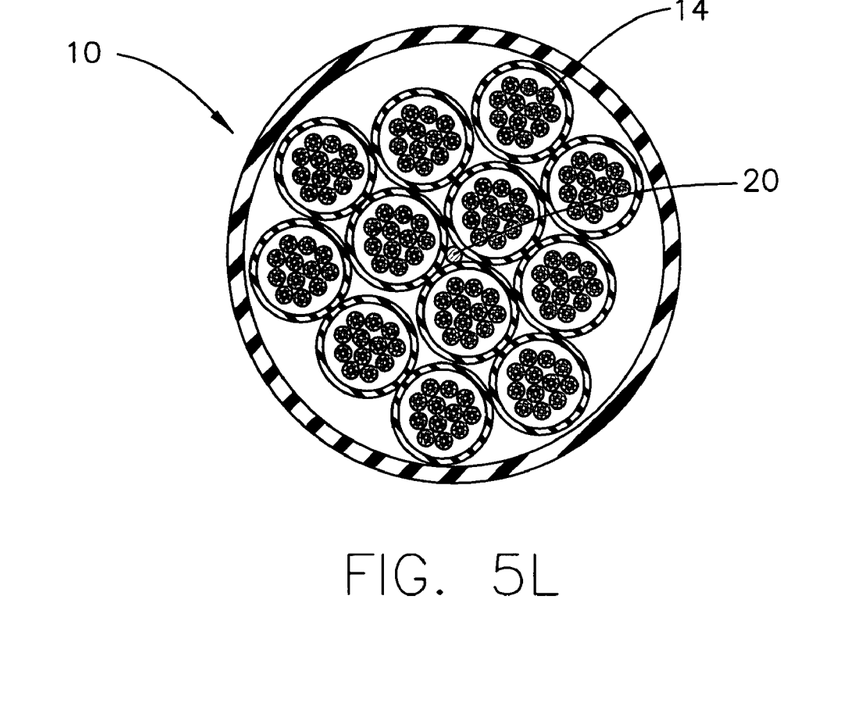
Figure 5M:
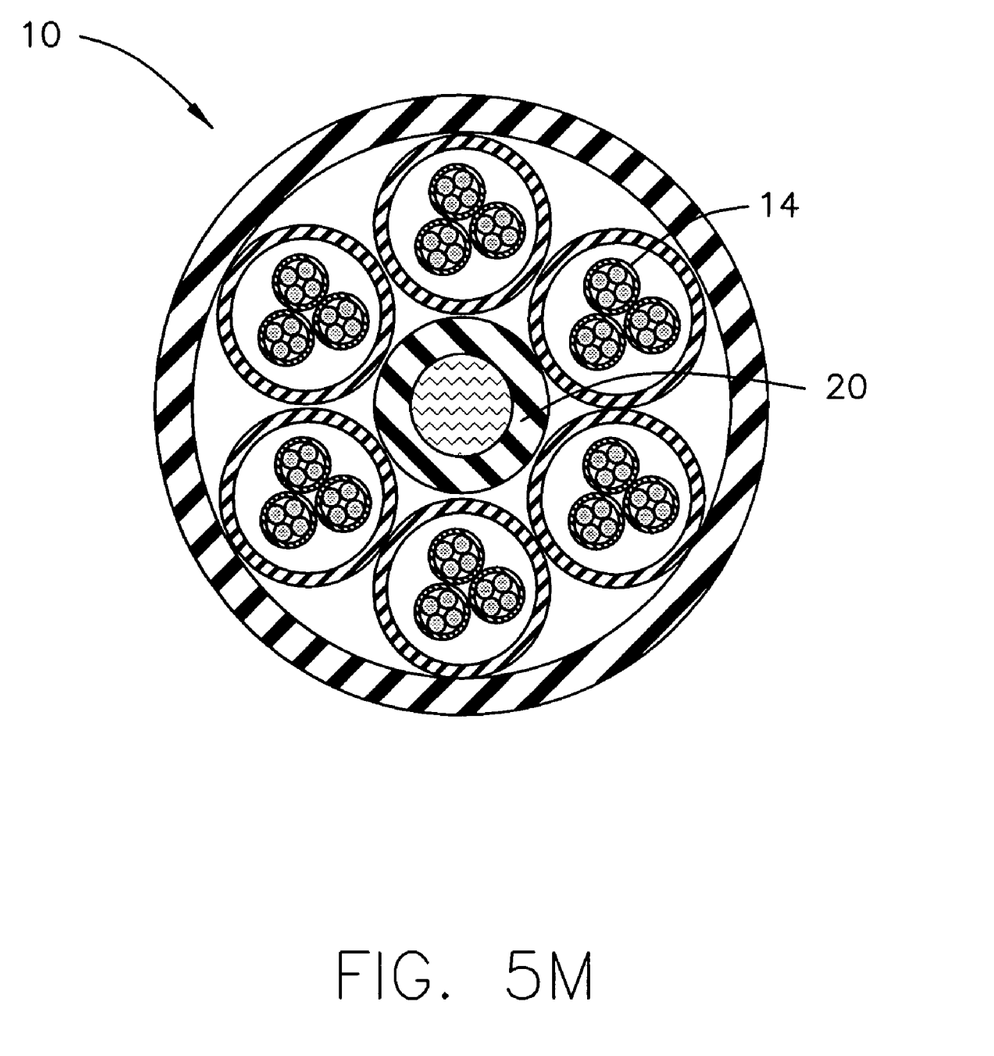

In another embodiment, illustrated in FIG. 4, water swellable yarns 18 may be added to the center of tube 14 between fibers 12. Water swellable yarns 18 are optionally helically spun and are used for both moisture absorption and to create a buffer space in the center of fibers 16 so that after extrusion and assembly of tubes 14, there is room in the center of fibers 16 for movement during the bending of cable 10 as explained in more detail below.

In one embodiment, FIGS. 5A-5G show various arrangements for cables 10 having one or more tubes 14, each of which maintain a four fibers 16 per tube configuration as described above. FIGS. 5H-5M show additional arrangements of larger cables 10 having more numerous tubes 14 and a central component 20 such as strength member formed, by example, from GRP (Glass Reinforced Polymer).

It is understood that the above described cables 10 are exemplary configurations. Any similar cables 10 using one or more tubes 14, each of which having similar four fiber geometry, are within the contemplation of the present invention.

In the above described cables 10, in each case, tubes 14 still maintain the above geometry of four fibers 16. Turning now to the size and geometry of tubes 14, preferably the outer diameter of tube 14 is substantially 0.042" and the inner diameter is substantially 0.025". Such an arrangement allows 20" strip capability for the installers of cable 10 while maintaining optical signal capacity at or above attenuation performance standards such as GR-409, GR 20 and ICEA 596 in temperatures in the range of 0° C. through −60° C. (with a possible attenuation change of 0.10 db/km at the lower rated temperatures). In an alternative arrangement which may perform in the lower range (of −40° C. through −60° C.), the outer diameter of tube 14 is substantially 0.038" and the inner diameter is substantially 0.0245". Here the strip capacity is reduced to 1"-3" due to the coefficient of friction or tightness of the jacket 14 against fibers 16.

Figure 6:
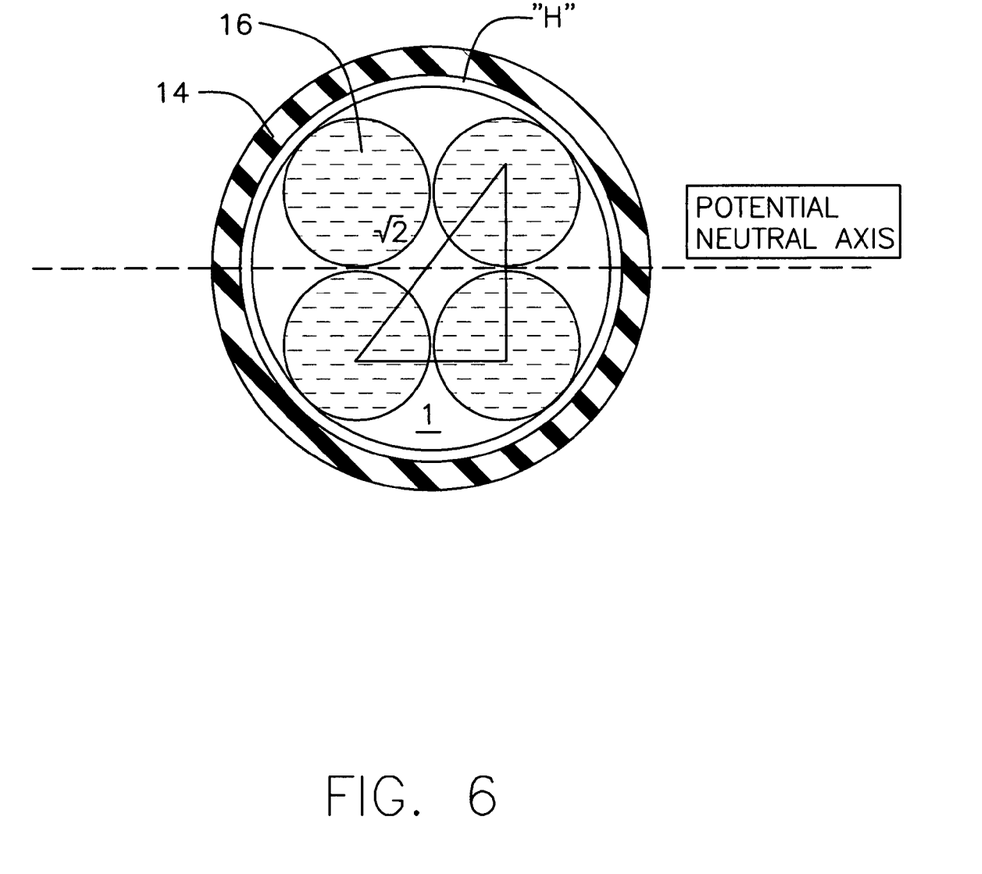
FIG. 6 illustrates an optical fiber cable in accordance with one embodiment.

Using the above example of an outer diameter of 0.042" as a basis, and based on the fiber 16 diameters of 250 nm or 0.00984", a 5% gap is created between the internal diameter of tube 14 and fibers 16. For example, as shown in FIG. 6, calculating the diameter of a circle drawn hypothetically around the four fibers 16 (labeled "H" in FIG. 6) is done according to the following equation:

$$(1.41421+1) \times 0.00984" = 0.023761. [(\sqrt{2}+1) \times \text{Diameter of fiber}]$$

As this diameter is substantially 5% less than the internal diameter of tubes 14, there is room for fibers 16 to flex their center's position relative to a neutral axis of bending (but not randomly twists or cross each other) within tube 14 during bending as described below.

In another embodiment, a gap of about 4% is feasible in the arrangement with the outside/inside diameter of jacket 12 as 0.038/0.0245.

Such an inner diameters for tube 14 are ideal for using a 0.25" setting on the commonly used miller stripping tool, and where the gap between the fibers 16 and tube 14 and the ability of fibers 16 to move somewhat, prevents them from being cut during stripping.

It is understood that although the above examples show an inner diameter of tube 14 as 0.025" it is possible that a larger diameter may be used up to 0.02622" (four fibers 16 diameter+¼ fiber diameter) and even up to 0.02868" (four fibers 16 diameter+¾ fiber diameter). The limit of such internal diameter of tube 14 being that it provides a sufficient gap to allow fibers 16 to move within tube 14 given the low modulus of the plastic used for tube 14, while simultaneously being allowed sufficiently little space so as to prevent random twisting or tangling of the un-stranded fibers 16.

Furthermore, the above arrangement, with the above described internal diameters of tube 14, is also dimensioned to allow a 20" strip of tube 14 from fibers 16. This is facilitated by the substantially 5% gap between fibers 16 and tube 14 and is such that the design couples the stiffness necessary to prevent the fibers from becoming wavy within tube 14 while not being overly constricted against fibers 16.

In another arrangement, the wall thickness is reduced from 0.00875" (OD−ID/2 or 0.042−0.0245/2) to 0.0085", and possibly as low as 0.004" whereby this reduced amount of plastic for tubes 14 would lend less restrictive forces to fibers 16 by way of less volume or mass. In such an arrangement the inner diameter of tube 14 may be placed in the range of substantially 0.027" and an outer diameter of 0.035".

In the present example, the polymer employed for tubes 14 of this reduced-wall thickness construction may employ a Young's modulus that results in a lower tensile strength range of 2500 PSI-2800 PSI with a coefficient of thermal expansion of substantially $3 \times 10^5$-$5 \times 10^5$ per 0° C. as opposed to polymers used in typical prior art arrangements using 4000-10,000 PSI rated polymers. One example of polymer used for tubes 14 may be a 2800 PSI tensile FRPVC plenum grade polymer.

The dimensions of optical fibers 16 and tubes 14 described above is such that cables 10 are able to be constructed with a minimum or no strength members as well as without the need for stranding of fibers 16. As described below, the four-fiber geometry allows for optimum movement during bending, without crowding of the fibers so as to optimize between bending stress durability and the number of high multi-fiber cables 10.

Figure 7A:
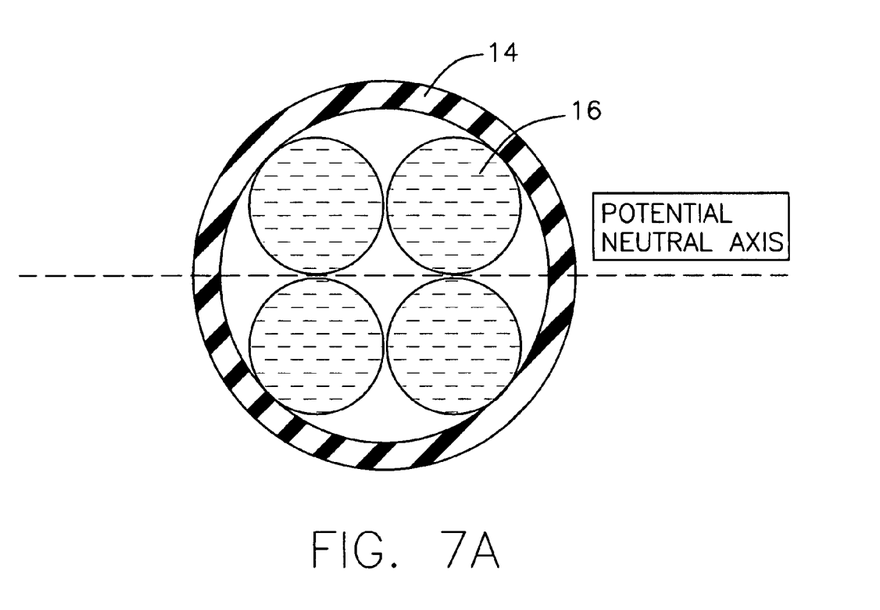
FIG. 7A illustrates the fiber tube cross section from the optical fiber cable from FIG. 3 along a potential neutral axis.

FIG. 7A illustrates cable 10 along a potential bend axis. In this configuration, each fiber 16 is separated from the hypothetical neutral bend axis by ½ of its diameter. Thus, according to a hypothetical 3 inch bend radius, the fiber circumference delta (length/length) is calculated as:

(0.005"/3")×100%−0.17%

Because fibers 16 are not locked into tubes 14 some mismatching in length may occur when cable 10 is bent. When a cable/tube is bent around any radius the fibers closest to the inner circumference of the bend exhibit a mismatch in total distance needed to be traversed versus those fibers along the outer circumference of the bend. The resulting differences in distance causes a fiber length mis-match which is one of the contributing factors to undesirable attenuation.

For example, Table 1 below, is a comparison of fiber length mismatch assuming a coil of 3" radius (bend radius) 10 where the concern would be about the relative length mismatches between each of the fibers 16 as they follow the various circumferences as shown in the following table 1.

Columns 1 and 5 are for four fibers in a locked (stranded, wrapped, no gap etc . . . ) arrangement, columns 2 and 6 are for four fibers according to the present arrangement, columns 3 and 7 are for six fibers in a tube according to the prior art and columns 4 and 8 are for 12 fibers in a tube according to the prior art diameter of tube 14 and the lengthening of the outer diameter of the tube 14 during the winding.

Column 1 is for four fibers in a locked arrangement, column 2 is for four fibers according to the present arrangement, column 3 is for six fibers in a tube according to the prior art and column 4 is for 12 fibers in a tube according to the prior art.

TABLE 2

Mandrel Wrap

| | | | | |
|---|---|---|---|---|
| # turns | 20 | 20 | 20 | 20 |
| Mandrel (inches) | 0.7 | 0.7 | 0.7 | 07 |
| unit od (inches) | 0.044 | 0.044 | 0.05 | 0.053 |
| length (inches) | 46.75 | 46.75 Shifted | 47.12 | 47.31 |
| Central Axis radius (inches) | 0.7 | 0.7 | 0.7 | 0.7 |
| Number of fibers | 4 | 4 | 6 | 12 |
| Approximate fiber diameter (inches) | 0.01 | 0.01 | 0.01 | 0.01 |
| Fiber Group Diameter (inches) | 0.017 | 0.017 | 0.024 | 0.035 |
| Closet Fiber Distance from axis (inches) | 0 | 1 | 0 | 1 |
| Farthest fiber distance from axis (inches) | 0.012 | 0.005 | 0.014 | 0.025 |
| Closest fiber circumference (inches) | 2.20 | 2.20 | 2.20 | 2.20 |
| Farthest fiber circumference (inches) | 2.24 | 2.21 | 2.24 | 2.28 |
| Circumference mismatch (%) | 1.72% | 0.71% | 2.07% | 3.52% |
| Cumulative mismatch (inches) | 0.8061 | 0.333906 | 0.976 | 1.665 |

From the above two tables, column 2, representing the four-fiber 16 arrangement of the present invention results in the lowest cumulative mismatch percentages, regardless of the number of turns. Such an advantage becomes more pronounced over the six fiber and twelve fiber prior art designs as the number of turns is increased (such as in table 2).

For example, the 0.17% fiber mismatch of the present four-fiber arrangement is a significant improvement over the

TABLE 1

| | | | | | | | | |
|---|---|---|---|---|---|---|---|---|
| Central Axis radius (inches) | 3 | 3 | 3 | 3 | 6 | 6 | 6 | 6 |
| Number of fibers | 4 | 4 | 6 | 12 | 4 | 4 | 6 | 12 |
| Approximate fiber diameter (inches) | 0.01 | 0.01 | 0.01 | 0.01 | 0.01 | 0.01 | 0.01 | 0.01 |
| Fiber Group Diameter (inches) | 0.017 | 0.017 | 0.024 | 0.035 | 0.017 | 0.017 | 0.024 | 0.035 |
| Closet Fiber Distance from axis (inches) | 0 | 1 | 0 | 1 | 0 | 1 | 0 | 1 |
| Farthest fiber distance from axis (inches) | 0.012 | 0.005 | 0.014 | 0.025 | 0.012 | 0.005 | 0.014 | 0.025 |
| Closest fiber circumference (inches) | 9.42 | 9.42 | 9.42 | 9.42 | 18.85 | 18.85 | 18.85 | 18.85 |
| Farthest fiber circumference (inches) | 9.46 | 9.44 | 9.47 | 9.50 | 18.89 | 18.87 | 18.90 | 18.93 |
| Circumference mismatch (%) | 0.40% | 0.17% | 0.48% | 0.82% | 0.20% | 0.08% | 0.24% | 0.41% |

In another example, Table 2 shows a similar chart to Table 1 regarding fiber length mismatches only with a more extreme bending situation of 20 turns on a 7" mandrel.

For example, if cable 10 or tube 14 of fibers 16, in an extreme situation, is wrapped around a 0.7" diameter mandral for 20 turns, this would further exacerbate the cumulative mismatch of lengths between each of fibers 16 within tube 14, generating a significant strain. This strain occurs during the bending of the cable where the outer fibers 16 along the out circumference of the bend are stretched and the inner fibers 14 along the inner circumference of the bend buckle, as they are forced (through friction etc . . . ) to eqiuvicate, at least partially, their length with the shrinking length of the inner 0.48% mismatch and 0.82% mismatch of the six and twelve fiber prior art arrangements respectively.

Figure 7B:
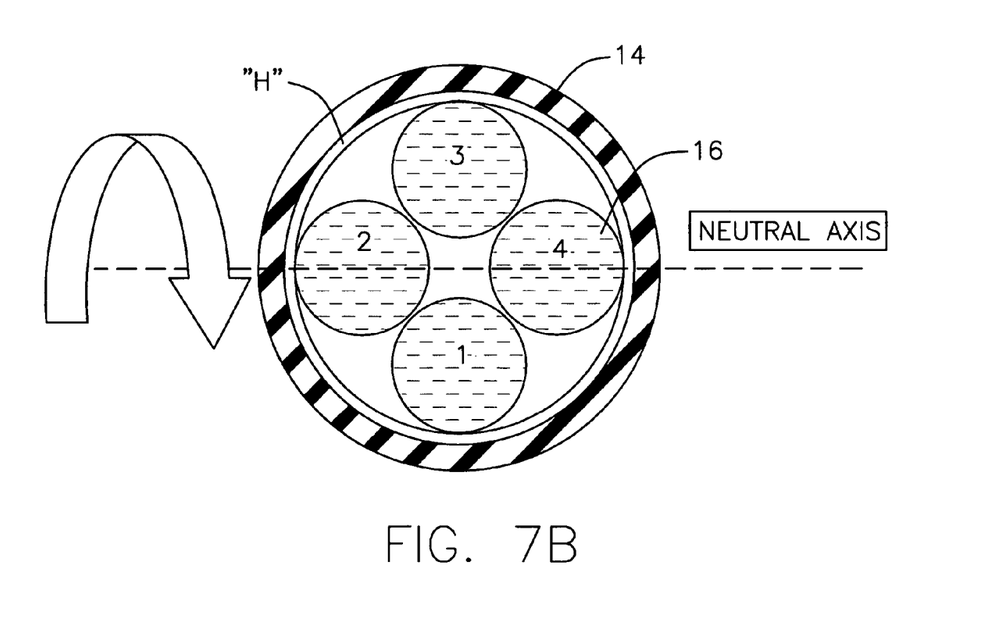
FIG. 7B illustrates the fiber tube cross section from the optical fiber cable from FIG. 6A bent over the neutral axis.

As shown in FIG. 7B, the four fiber geometry of tubes 14 results in a bend configuration whereby two of fibers 16 (shown as upper and lower fibers 16 in FIG. 6B) remain apart from the bend axis and two of fibers 16 (shown as left and right fibers 16 in FIG. 6B) within tube 14 move into the bend axis. Such an arrangement, allows half of the fibers to remain in the bend axis, a configuration that higher count fiber tubes from the prior art can not achieve, and thus results in the potential circumference mismatch of the present invention being shifted from 0.40% as in the prior art to 0.17%, as noted in Table 1.

Stated another way, in this case the minimum stress state (0% mismatch) is reached for the two fibers 16 that occupy the neutral axis of the potential bend.

In other embodiments of the present invention, such bend results are similarly achieved in each of the tubes 14 in the case of multi-tube 14 cables 10 such as those shown in FIGS. 5B-5M. For example, in these arrangements, tubes 14, constructed as above, are then stranded as a larger population of tubes 14 within a larger jacket 12, possibly around a csm (central strength member 20).

In one example of cable 10 having several stranded tubes 14, the lay length (stranding rate) of tubes 14 is preferably set to be substantially equal to the smallest typical drum diameter on which they are wrapped onto. For example, a cable 10 having several tubes 14 of the above construction stranded within a single jacket 12, may be stranded at a 12" lay length assuming that cable 10 is to be wound on a typical drum having a diameter of 12"

This stranded arrangement for tubes 14 within jacket 12 allows tubes 14 within cable 10 to achieve bends of a radius as low as 3" (or smaller in non-continuous bends), with the looseness of tubes 14 within jacket 12 allowing for sufficient adjustment to the bend stress.

Shorter lay lengths may be used when csm 20 is employed. In any case, the stranding of tubes 14 within cable 10 is such that the longitudinally arranged four fiber tubes 14 is such that necessary stiffness is retained in tubes 14 to prevent repositioning or cross over of the non-stranded fibers 16 therein during the bending of cable 10 as discussed above.

It is noted that there are some commercially available twelve fiber/per tube, multi tube cable structures where the fibers are S-Z stranded and encased within a gel filled tight tube. In these prior art arrangements the inside diameter of the tubes are 0.045" or 25%-32% greater than the twelve fiber group outside diameter or 0.034"-0.036". This spacing of 0.045"-0.035", or a 0.010 thickness, results in a fiber-inner tube diameter gap of a full fiber width which sometimes allows a crossover of fibers. These assemblies are thus highly compression or crush sensitive. To prevent attenuation, the units are very loosely stranded within hard double walled exterior assembly to prevent compression's direct impact with the interior of the fibers/tubes. In some cases this necessitates a cable outside diameter of 0.429" for a 72-fiber cable as compared to an outside diameter of 0.274" for a 72-fiber cable. Also the utilization of gel in this prior art arrangement as mentioned before in the background is a fuel and prevents such a design from being used in plenum spaces or having a plenum rating.

As a result of the dimensions noted above, and the resulting beneficial geometry of the four fiber tube 14, a 40-70% cost reduction in materials is achieved over the traditional cable configurations having the same fiber counts/per cable. Furthermore, the present design achieves attenuation results in the range of approximately 0.4/0.3 dB/km at 1310 nm-1550 nm for single mode fibers; 02.23/0.56 dB/km at 850 nm-1300 nm for 50 micron fibers; and 2.85/0.57 db/km at 850 nm-1300 nm for 62.5 micron fibers at room temperature after manufacture. This indicates a very small increase in attenuation in the range of 0.05-0.1 dB/km from the incoming fiber, prior to placement within the tight tube. Prior art cables having the same number of fibers 16 arranged in tubes with more than four fibers per tube, such as six and twelve fiber dry tubes, which display attenuation results in the range of 1.4/1.3 dB/km for single mode fibers resulting in a typical 1 db increase in attenuation. Similarly, multimode fibers of 50 micron or 62.5 micron core diameter typically see an increase in 0.5-1.0 db/km in the 6 and 12 fiber dry tight tubes at their measured and operation wavelengths of 850 and 1300 nm. With gel, presumably the attenuation of these six and twelve fiber tubes could be reduced somewhat, but it would then be unable to meet the desired fire safety standards.

In sum, the above described four fiber 16 construction within tubes 14, regardless of whether cable 10 maintains one or more tubes 14, allows the opportunity to achieve a minimal stress state on fibers 16 without stranding the fibers within tubes 14 or having a great area of looseness within tube 14. The longitudinal orientation of fibers 16 greatly aids in crush performance as fibers 16 are not criss-crossing when weight is applied to cable 10. This prevents fibers 16 in the present arrangement from mircobending on themselves as is the case with the prior art arrangements where attenuation results from crisscrossing of stranded fibers within the tubes and the allowance of random fiber placement in the larger looser tubes.

In another embodiment, it is understood that the four fiber 16 per tube 14 arrangement as described herein is different than the typical six and twelve fiber industry standard arrangements. In order to facilitate back-connection to pre-existing color coding systems, such as the TIA 598 color standard, the arrangement of the present invention is such that for every three tubes 14, all twelve color fibers 16 of the standard colors are represented.

For example, the current TIA standard employs a twenty four color standard which calls for twelve colors different colors, then using the same twelve colors with black dashes for fibers thirteen through twenty four.

TABLE 3

Color Code Chart: Fiber Optic Cables*

| Fiber/Tube No. | Color |
|---|---|
| 1 | Blue |
| 2 | Orange |
| 3 | Green |
| 4 | Brown |
| 5 | Gray |
| 6 | White |
| 7 | Red |
| 8 | Black |
| 9 | Yellow |
| 10 | Purple |
| 11 | Rose |
| 12 | Aqua |

*Per TIA/EIA 598-A

Figure 8:
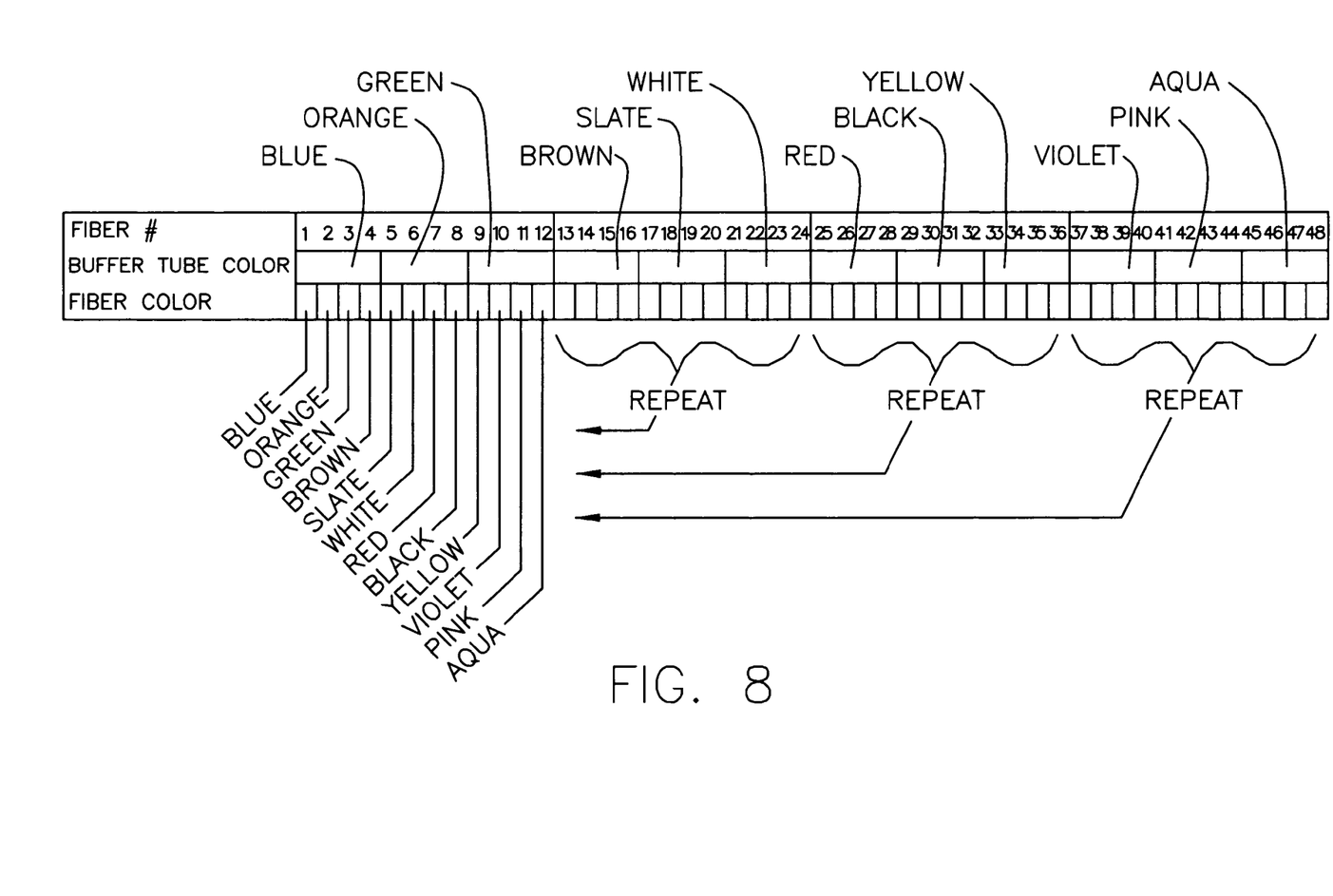
FIG. 8 illustrates a sample 36 fiber cable with coloring of the fibers in accordance with one embodiment.

For example, as illustrated in FIG. 8, in one arrangement of a forty eight fiber cable 10 having twelve tubes 14, each of four fibers 16, the tubes 14 may be colored in accordance with the below described sequence. The first four tubes colored Brown, Blue, Red and Violet each maintain four fibers 16 of the colors Blue, Orange, Green, and Violet. The second four tubes 14 are colored Orange, Slate, Black and Rose and each maintain four fibers 16 of the colors Slate, White, Red and Black. Finally, the third set of four tubes 14 are colored Green, White, Yellow and Aqua and each maintain four fibers 16 of the colors Yellow Violet Rose and Aqua.

In such an arrangement, for each set of three tubes 14 (as shown sequentially divided in Figure), the arrangement of the present invention has the twelve color fibers 16 from the conventional arrangement for group connectorization or ribboning with existing While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. An optical fiber cable, said cable comprising:
   an outer jacket;
   at least one optical fiber tube within said jacket; and
   for each optical fiber tube, four optical fibers, arranged, independently from one another, in a substantially squared arrangement, said optical fibers being longitudinally linearly arranged along the length of said cable, and said optical fibers being loosely arranged within said fiber tube to allow shifting of said straight optical fibers to conform to a bending of said cable, while being simultaneously constrained such that said straight arranged fibers do not become crossed-over or overlapped during bending.

2. An optical fiber cable as claimed in claim 1, wherein said optical fiber tubes are free from any filler gels and strength members.

3. The optical fiber cable as claimed in claim 1, wherein the internal diameter of said fiber tube is substantially 0.025 inches.

4. The optical fiber cable as claimed in claim 1, wherein the gap formed between the outer diameter of said four optical fibers and said inner diameter of said fiber tube is substantially in the range of 4%-5%.

5. The optical fiber cable as claimed in claim 1, wherein said fibers with said cable exhibit an attenuation substantially in the range of 0.4/0.3 dB/km at 1310 nm-1550 nm for single mode fibers.

6. The optical fiber cable as claimed in claim 1, wherein said fibers with said cable exhibit an attenuation substantially in the range of 2.23/0.56 dB/km at 850 nm-1300 nm for 50 micron fibers.

7. The optical fiber cable as claimed in claim 1, wherein said fibers with said cable exhibit an attenuation substantially in the range of 2.85/0.57 db/km at 850 nm-1300 nm for 62.5 micron fibers.

8. The optical fiber cable as claimed in claim 1, wherein said cable exhibits a circumference fiber length mismatch percentage of 0.17% across a three inch bend radius.

9. The optical fiber cable as claimed in claim 1, wherein said cable exhibits a circumference fiber length mismatch percentage of 0.08% across a six inch bend radius.

10. The optical fiber cable as claimed in claim 1, wherein said cable exhibits a circumference fiber length mismatch percentage of 0.71% across 20 revolutions around a 0.7 inch mandrel.

11. The optical fiber cable as claimed in claim 1, further comprising at least three optical tubes, each having four optical fibers therein, wherein said twelve optical fibers each maintain one color, different from each other, in accordance with TIA industry standard optical fiber coloring.

12. The optical fiber cable as claimed in claim 11, wherein said cable comprises between three and twenty four tubes, each having four optical fibers therein, wherein within each three tubes are twelve fibers, each containing twelve colors collectively according to TIA industry standards so as to allow said tubes to be transposed into a quantity of one through eight twelve fiber connectorization groups.

13. The optical fiber cable as claimed in claim 1, wherein said outer jacket of said cable may be stripped from said optical fiber tubes for at least 20" without damaging said optical fiber tubes.

14. An optical fiber cable, said cable comprising:
   an outer jacket;
   at least one optical fiber tube within said jacket; and
   for each optical fiber tube, a plurality of optical fibers, arranged independently from one another, said optical fibers being longitudinally linearly arranged along the length of said cable, and said optical fibers being loosely arranged within said fiber tube to allow shifting of said straight optical fibers to conform to a bending of said cable, while being simultaneously constrained such that said straight arranged fibers do not become crossed-over or overlapped during bending.

15. An optical fiber cable as claimed in claim 14, wherein said arrangement includes four optical fibers within a tube, arranged in a substantially squared arrangement, independent from one another.

16. An optical fiber cable as claimed in claim 14, wherein said optical fiber tubes are free from any filler gels and strength members.

17. The optical fiber cable as claimed in claim 14, wherein the internal diameter of said fiber tube is substantially 0.025 inches.

18. The optical fiber cable as claimed in claim 14, wherein the gap formed between the outer diameter of said four optical fibers and said inner diameter of said fiber tube is substantially in the range of 4%-5%.

19. The optical fiber cable as claimed in claim 14, further comprising at least three optical tubes, each having four optical fibers therein, wherein said twelve optical fibers each maintain one color, different from each other, in accordance with TIA industry standard optical fiber coloring.

20. The optical fiber cable as claimed in claim 19, wherein said cable comprises between three and twenty four tubes, each having four optical fibers therein, wherein within each three tubes are twelve fibers, each containing twelve colors collectively according to TIA industry standards so as to allow said tubes to be transposed into a quantity of one through eight twelve fiber connectorization groups.

* * * * *